United States Patent
Lauer et al.

(10) Patent No.: US 9,849,915 B2
(45) Date of Patent: Dec. 26, 2017

(54) MOTOR VEHICLE

(71) Applicant: Bayerische Motoren Werke Aktiengesellschaft, Munich (DE)

(72) Inventors: Ingo Lauer, Munich (DE); Erich Brem, Mering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 99 days.

(21) Appl. No.: 14/812,821

(22) Filed: Jul. 29, 2015

(65) Prior Publication Data

US 2015/0329145 A1 Nov. 19, 2015

Related U.S. Application Data

(63) Continuation of application No. PCT/EP2014/051548, filed on Jan. 27, 2014.

(30) Foreign Application Priority Data

Jan. 30, 2013 (DE) .................. 10 2013 201 558

(51) Int. Cl.
  *B62D 25/02* (2006.01)
  *B62D 21/15* (2006.01)

(52) U.S. Cl.
  CPC .......... *B62D 25/025* (2013.01); *B62D 21/152* (2013.01)

(58) Field of Classification Search
  CPC ....................... B62D 21/152; B62D 25/025
  USPC .................................................. 280/784
  See application file for complete search history.

(56) References Cited

U.S. PATENT DOCUMENTS

| 4,973,103 A | * | 11/1990 | Imajyo | .................. B62D 25/02 296/191 |
| 5,228,741 A | * | 7/1993 | Ide | ....................... B62D 21/152 296/187.11 |
| 7,438,151 B2 | | 10/2008 | Winkler | |
| 8,366,185 B2 | | 2/2013 | Herntier | |
| 8,371,643 B2 | | 2/2013 | Itakura | |

(Continued)

FOREIGN PATENT DOCUMENTS

| DE | 199 56 430 A1 | 5/2001 |
| DE | 100 28 716 A1 | 6/2001 |

(Continued)

OTHER PUBLICATIONS

Ballenthien, et al. DE 10 2010 014749 English Machine Translation.*

(Continued)

*Primary Examiner* — Karen Beck
(74) *Attorney, Agent, or Firm* — Crowell & Moring LLP

(57) ABSTRACT

A profiled reinforcement section arranged in the hollow area of a sill of a motor vehicle has at least one additional profiled reinforcement section. At least one of an arrangement, shape, length, material and connection of the profiled reinforcement sections is configured such that the end faces of the profiled reinforcement sections deform or destroy a motor vehicle front wheel which is moving in the direction of a passenger compartment as a result of an impact, together with the components associated with the wheel, in the event of a correspondingly high impact energy of the respective wheel against the respective front end of the respective sill.

16 Claims, 4 Drawing Sheets

(56) References Cited

U.S. PATENT DOCUMENTS

| | | | | |
|---|---|---|---|---|
| 8,585,134 | B2* | 11/2013 | Yasui | B62D 21/152 296/204 |
| 2005/0264042 | A1* | 12/2005 | Abe | B62D 25/025 296/203.01 |
| 2006/0001294 | A1* | 1/2006 | Balgaard | B62D 25/2036 296/209 |
| 2006/0202519 | A1* | 9/2006 | Latimer, III | B62D 25/2036 296/203.04 |
| 2007/0187995 | A1* | 8/2007 | Mouch | B62D 25/025 296/209 |
| 2010/0207426 | A1* | 8/2010 | Tsuruta | B62D 21/157 296/187.12 |
| 2010/0207428 | A1* | 8/2010 | Fukushima | B62D 25/02 296/203.03 |
| 2012/0256448 | A1 | 10/2012 | Yasui et al. | |
| 2015/0014084 | A1* | 1/2015 | Iwama | B62D 25/082 180/312 |
| 2015/0145283 | A1* | 5/2015 | Nishino | B62D 25/2045 296/187.1 |
| 2016/0325786 | A1* | 11/2016 | Elfwing | B62D 25/025 |

FOREIGN PATENT DOCUMENTS

| | | |
|---|---|---|
| DE | 101 30 450 A1 | 1/2003 |
| DE | 103 52 725 A1 | 6/2005 |
| DE | 10 2005 050 959 A1 | 7/2007 |
| DE | 10 2007 030 955 A1 | 1/2009 |
| DE | 10 2010 014 749 A1 | 11/2010 |
| DE | 10 2010 022 151 A1 | 11/2010 |
| DE | 10 2011 102 761 A1 | 1/2012 |
| DE | 10 2011 085 673 A1 | 5/2012 |
| DE | 10 2011 051 622 A1 | 1/2013 |
| DE | 102012206032 A1 * 10/2013 | ........... B62D 25/025 |
| EP | 1 401 685 B1 | 1/2005 |
| EP | 2 014 539 A1 | 1/2009 |
| JP | WO 2012173278 A1 * 12/2012 | ........... B62D 25/025 |
| JP | WO 2014083704 A1 * 6/2014 | ........... B62D 25/025 |
| JP | WO 2015045657 A1 * 4/2015 | ............ B62D 25/04 |
| WO | WO 02/094618 A1 | 11/2002 |

OTHER PUBLICATIONS

Bogle, et al. DE 10 2012 20632 A1 English Machine Translation.*
Oggianu, et al. EP 2014 539 English Machine Translation.*
M. Herntier, DE 10 2011 051622 English Machine Translation.*
International Search Report dated Mar. 27, 2014 (Three (3) pages).
German Search Report dated Oct. 4, 2013, with Statement of Relevancy (Six (6) pages).

* cited by examiner

MOTOR VEHICLE

CROSS REFERENCE TO RELATED APPLICATIONS

This application is a continuation of PCT International Application No. PCT/EP2014/051548, filed Jan. 27, 2014, which claims priority under 35 U.S.C. §119 from German Patent Application No. 10 2013 201 558.5, filed Jan. 30, 2013, the entire disclosures of which are herein expressly incorporated by reference.

BACKGROUND AND SUMMARY OF THE INVENTION

EP 1 401 685 B1 has already disclosed a method for limiting the damage in the case of a partially overlapping frontal collision and a motor vehicle with an apparatus which serves for this purpose.

A partially overlapping frontal collision is to be understood to mean a frontal collision, in which the vehicles move toward one another with direction vectors which are substantially parallel but offset laterally with respect to one another. The collision zone is therefore only one lateral part of the front section.

In the vehicle which is known from EP 1 401 685 B1, pivoting inward of the front wheels is caused in the case of a partially overlapping frontal collision of two motor vehicles, with the result that the outer side of the rim acts as a protective shield, on which the other vehicle or its collision-side wheel slides.

It is an object of the invention to provide measures for deforming and destroying a front wheel of a motor vehicle which moves in the direction of the passenger cell as the result of an impact.

A motor vehicle according to the invention has a vehicle body which forms a passenger cell. A front section is provided in front of the passenger cell, on which front section two wheel arches are configured. In each case, one front wheel is arranged such that it can be steered in the respective wheel arch having a front wall which delimits the passenger cell to the front toward the front section, the front wall being delimited laterally in each case by a front vehicle body pillar, in each case the front end of a sill being configured at one lower end of the respective front vehicle body pillar, each respective sill running toward the rear in the longitudinal direction of the vehicle body to a respective rear wheel arch, each respective sill forming a respective hollow profile, and at least one reinforcement profile being arranged in a cavity of each respective hollow profile.

The reinforcement profile which is arranged in the cavity is advantageously provided with at least one additional reinforcement profile. The arrangement, the shape, the length, the material and/or the connection of the reinforcement profiles are/is designed in such a way that, in the case of correspondingly high impact energy of the respective wheel on the respective front end of the respective sill, the front faces of the reinforcement profiles destroy the wheel with the associated components.

The respectively present additional reinforcement profile extends advantageously from a front end of the sill over a predefined length. The respective originally present reinforcement profile is connected to the respective additional reinforcement profile. The respective reinforcement profile in each case has at least one front face at its respective front end at the level of the front end of the sill.

In one advantageous embodiment, the reinforcement profile to be reinforced which is arranged in the cavity of the sill has a hat-shaped cross section.

The respective additional reinforcement profile advantageously has a U-shaped cross section.

In one advantageous embodiment, the respective additional reinforcement profile forms a closed profile with the reinforcement profile which is already present.

The respective additional reinforcement profile is advantageously connected via side wall sections at the approximately horizontally lying longitudinal side walls of the reinforcement profile which is already present, which longitudinal side walls extend in the vehicle transverse direction.

A closed multiple-chamber profile with three closed chambers or profiles results in the cavity of the sill as a result of the arrangement of the two reinforcement profiles.

In addition to the U-shaped reinforcement profile which is arranged on the inner faces of the reinforcement profile which is to be reinforced, at least one further reinforcement profile is advantageously provided, the further reinforcement profile forming an extension in the downward and/or upward direction of a longitudinal side wall of the reinforcement profile, which longitudinal side wall lies in the perpendicular plane, such that the result is at least one multiple-chamber profile with at least four closed chambers.

In one advantageous embodiment, the material of the sill is a metal or a non-metallic material such as fiber-reinforced plastic. The material of the reinforcement profile to be reinforced is advantageously a metal or a non-metallic material such as a fiber-reinforced plastic. In one advantageous embodiment, the material of the first reinforcing reinforcement profile is a metal or a non-metallic material such as a fiber-reinforced plastic. The material of the second reinforcing reinforcement profile is advantageously a metal or a non-metallic material such as a fiber-reinforced plastic.

In one advantageous embodiment, a length of the first additional reinforcement profile and a length of the second additional reinforcement profile extend over a length which corresponds approximately to the mean width of the respective A-pillar which is configured above it.

By way of the measures according to the invention, energy is dissipated and deformation of the passenger cell is prevented.

In the following text, one embodiment of the invention is described by way of example using the drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
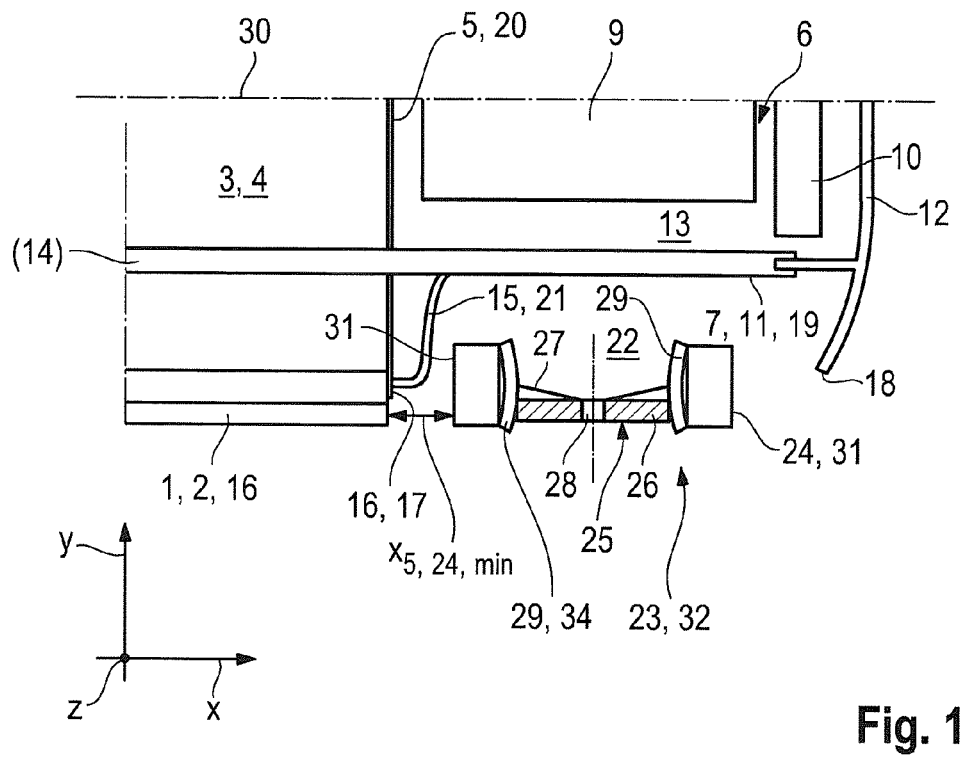
FIG. 1 shows a diagrammatic illustration of a front region of a left-hand half of a motor vehicle in a viewing direction from below toward an underside of the motor vehicle.

FIG. 1 shows a view from below of a front region of a motor vehicle 1. The motor vehicle 1 has a vehicle body 2 with a passenger cell 4. The floor 3 of the passenger cell 4 is shown in FIG. 1. A front section 6 of the motor vehicle 1 is configured in front of a front wall 5 of the passenger cell 4.

An engine 9 and further components, such as a radiator 10, are arranged in the front section 6 of the motor vehicle 1 between two longitudinal carriers 7 which are spaced apart in the vehicle transverse direction y and two engine carriers 8 (FIG. 3) which are spaced apart in the vehicle transverse direction y. A bumper 12 is arranged at in each case one front end 11 of the respective longitudinal carriers 7 in the embodiment which is shown in FIG. 1.

The region between the two longitudinal carriers 7 and the two engine carriers 8 of the front section 6 delimits the engine compartment 13 in the vehicle transverse direction y and in the vehicle vertical direction z. A rear end 14 of the respective longitudinal carriers 7 is arranged on the floor 3 of the passenger cell 4, for example at the level of the rear seat row, or runs to rear longitudinal carriers which are configured in a vehicle rear.

In the embodiment which is shown, in each case one transverse carrier 15 is arranged in front of the front wall 5 in the front section 6 on both sides between the respective longitudinal carriers 7 and a front end 17 of a respective sill 16 at the level of a rear end of a respective wheel arch 22.

A front wheel arch 22 which is not shown in further detail is configured between an outer end 18 of the bumper 12, and an outwardly directed outer face 19 of the longitudinal carrier 7 and an outer face 20 of the front wall 5, which outer face 20 is directed toward the front section 6, and an outer face 21 of the transverse carrier 15, which outer face 21 is directed toward the front section 6. The wheel arch 22 is situated in each case on both sides of the front section 6.

A (complete) wheel or wheel 23 is arranged via links (not shown) in the front wheel arch 22. The wheel 23 has a tire 24 which is arranged on a spoke wheel 25. A construction of this type of a spoke wheel 25 is known, for example, from DE 101 30 450 A1.

According to the spoke wheel which is described in DE 101 30 450 A1, the spoke wheel 25 consists of a wheel disk 26 and a spoke rim 27 which is arranged thereon, and a hub 28 which is configured in the center of the wheel disk 26. A rim 29 is arranged on the wheel disk 26.

In FIG. 1, the wheel 23 is situated parallel to a longitudinal axis 30 of the motor vehicle 1, which longitudinal axis 30 runs in the vehicle longitudinal direction x. A wheel running face 31 of the tire 24 is situated at a minimum spacing $x_{5,24,min}$ in relation to the front wall 5 in a plan view. In FIG. 1, the wheel 23 has a functional state 32 and would bring about driving straight ahead if the motor vehicle 1 were driven forward in the vehicle longitudinal direction x.

Figure 2:
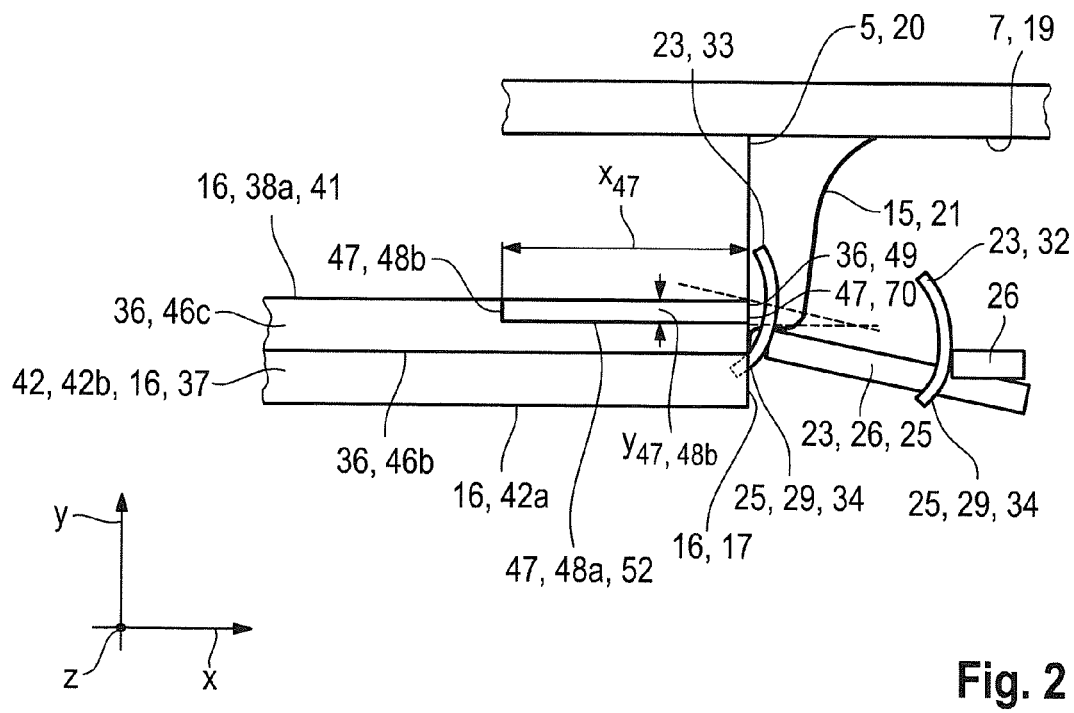
FIG. 2 shows an enlarged illustration of a region between a front wall and an outer sill and a displacement of a wheel or rim in the direction of the outer sill in the case of an accident.

FIG. 2 shows the wheel 23 in a functional state 32 and in a non-functional state 33. Furthermore, the tire 24 has been omitted in FIG. 2. The wheel 23 has been displaced, for example by way of an accident, from the functional state 32 which is shown in FIG. 1 into the non-functional state 33 of FIG. 2, in which accident a wheel running face 31 of the tire 24 which faces the bumper 12 has driven into an obstacle.

A rim flange 34 which faces away from the vehicle body 2 has come into contact with the front end 17 of the sill 16. The rim flange 34 has loaded a hat-shaped reinforcement profile 36.

Figure 3:
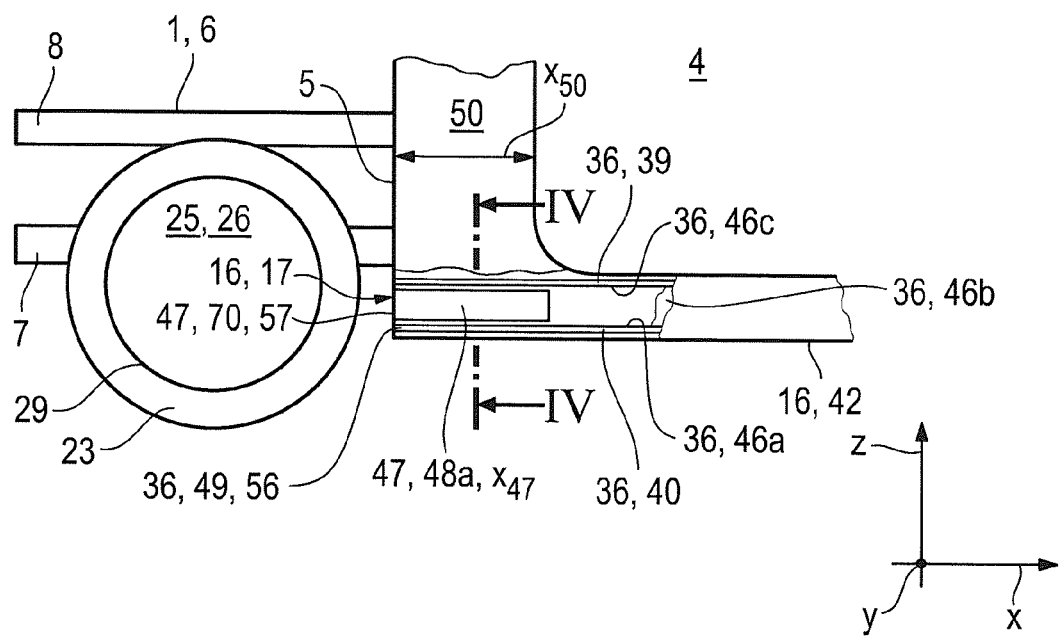
FIG. 3 shows a side view of a front region of the motor vehicle at the level of an A-pillar and the adjoining outer sill, a front end of the outer sill being sectioned, with the result that a single additional reinforcement profile can be seen.
Figure 4:
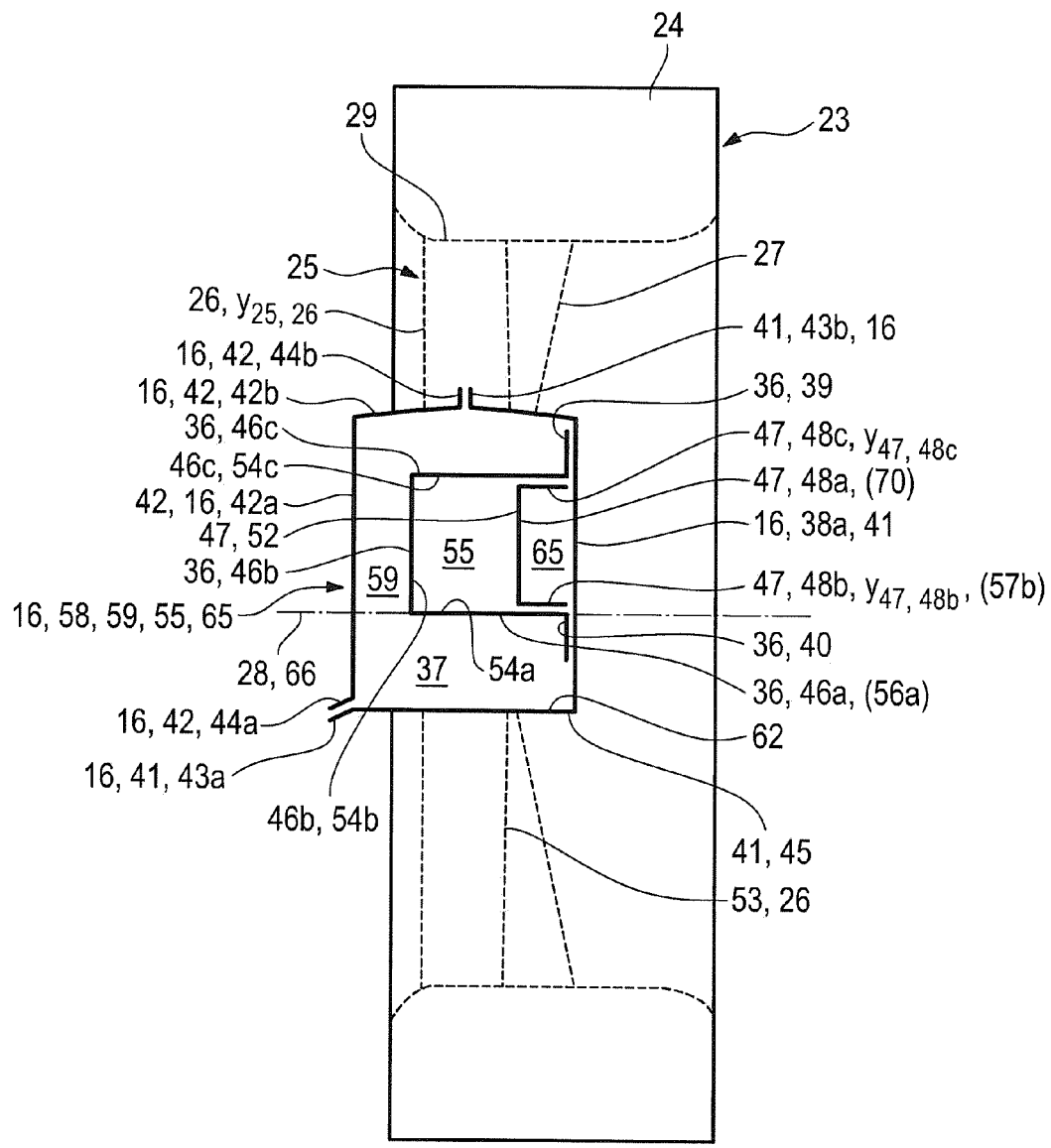
FIG. 4 shows a section through the outer sill in the viewing direction toward the rim of the front wheel which is situated in front of the outer sill.
Figure 5:
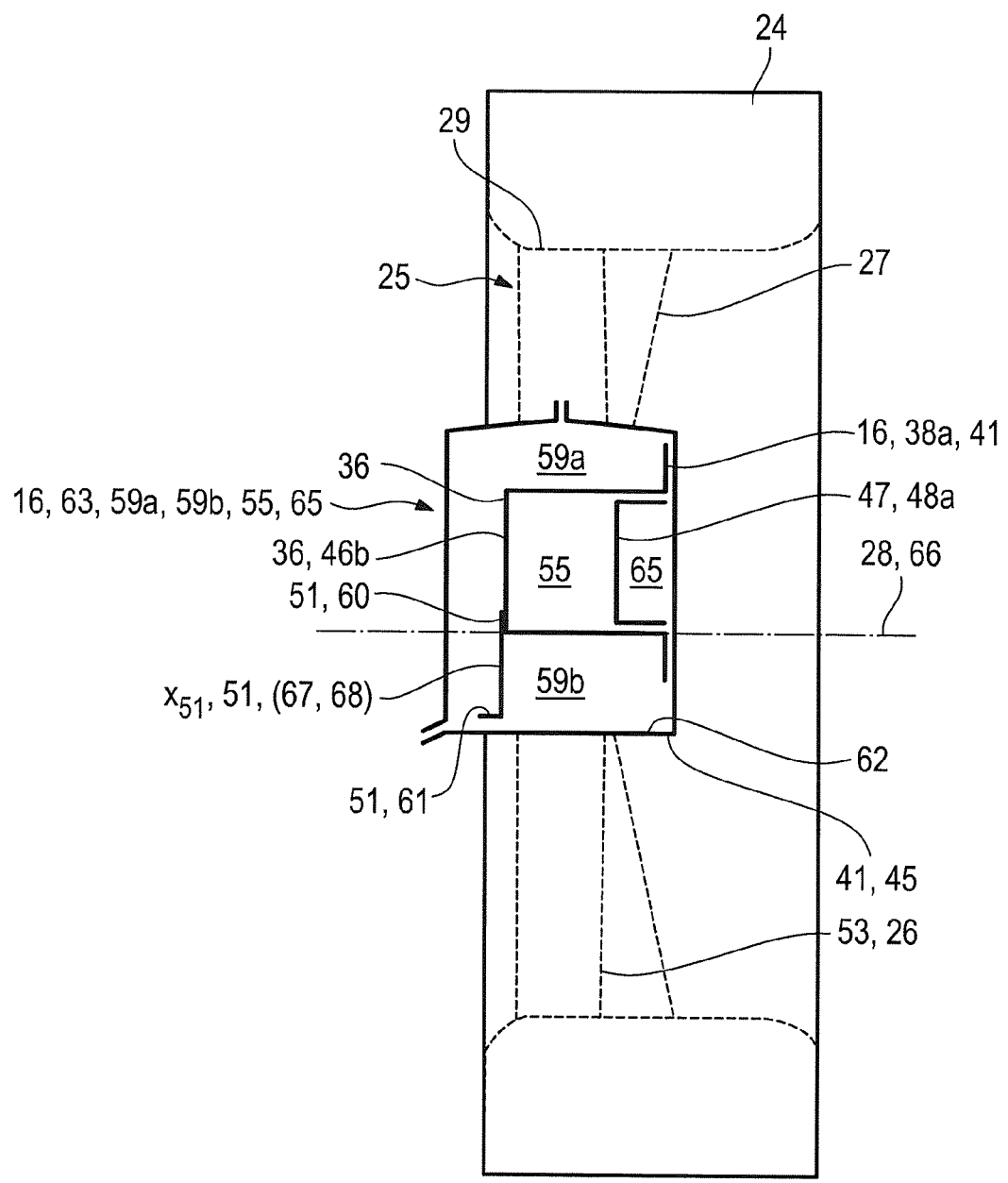
FIG. 5 shows a sectional view through the outer sill in the direction of that rim of the front wheel which is situated in front of the sill, two additional reinforcement profiles being provided in the cavity of the sill.

The reinforcement profile 36 has longitudinal flanges 39, 40 which are shown in FIGS. 3, 4 and 5. Via the longitudinal flanges 39, 40, the reinforcement profile 36 is fastened to a side wall 38a of the sill 16 in a cavity 37 of the sill 16. In one embodiment, the side wall 38a of the sill 16 is of perpendicular configuration and points toward the vehicle longitudinal axis 30 in the direction of the passenger cell 4.

As is apparent from FIGS. 4 and 5, the side wall 38a is a single-piece constituent part of a substantially U-shaped longitudinal profile 41. The longitudinal profile 41 has two longitudinal flanges 43a, 43b. In the embodiment which is shown in FIGS. 4 and 5, the longitudinal profile 41 is connected to an L-shaped longitudinal profile 42. The longitudinal profile 42 has two longitudinal flanges 44a, 44b. The two longitudinal profiles 41 and 42 are connected to one another via their respective longitudinal flanges 43a, 43b and longitudinal flanges 44a, 44b. The longitudinal flange 43a is configured on a side wall 45 of the longitudinal profile 41.

In FIG. 2, the lower side wall 45 of the longitudinal profile 41, which side wall 45 lies in a perpendicular plane, has been omitted. Furthermore, a downwardly pointing longitudinal side wall 46a of the reinforcement profile 36, which longitudinal side wall 46a lies in a horizontal plane, has been omitted.

As a result of the omission of the side wall 45 of the longitudinal profile 41 and the omission of the longitudinal side wall 46a of the reinforcement profile 36, a longitudinal side wall 46b of the reinforcement profile 36, which longitudinal side wall 46b lies in the perpendicular plane z-x, and an upper longitudinal side wall 46c of the reinforcement profile 36, which longitudinal side wall 46c lies in a horizontal plane y-z, are visible.

Furthermore, an outer longitudinal side wall 42a of the longitudinal profile 42 of the sill 16, which longitudinal side wall 42a lies in a perpendicular plane z-x, and the inner longitudinal side wall 38a of the longitudinal profile 41 of the sill 16, which longitudinal side wall 38a lies in the perpendicular plane z-x, and a side wall 42b of the longitudinal profile 42 of the sill 16, which side wall 42b lies in a horizontal plane, can be seen.

Furthermore, the length $x_{47}$ of an additional reinforcement profile 47 can be seen in FIG. 2. In FIG. 2, a lower side wall 48b of the additional reinforcement profile 47, which side wall 48b lies in a horizontal plane y-x, is visible. The side wall 48b of the additional reinforcement profile 47 is adjoined by a perpendicularly running side wall 48a of the reinforcement profile 47 with its outer face 52 which faces toward the wheel disk 26.

A width $y_{47,48a}$ of the side wall 48b of the additional U-shaped reinforcement profile 47 and the length $x_{47}$ of the additional U-shaped reinforcement profile 47 are dimensioned in such a way that that front end 49 of the reinforcement profile 36 which is reinforced by way of the additional reinforcement profile 47 and faces the crossmember 15 has a predefined rigidity and strength.

The predefined rigidity and strength of the reinforced front end 49 of the reinforcement profile 36 are designed in such a way that the rim 29 and the wheel disk 26 with the possibly present spoke rim 27 of the spoke wheel 25 are destroyed in the case of an impact of the wheel 23 or the spoke wheel 25 with the front end 17 of the sill 16 or with the front end 49 of the reinforcement profile 36 or with a front end 70 of the reinforcement profile 47.

FIG. 3 shows a diagrammatic side view of a front region of the motor vehicle 1 which shows the front section 6 with a longitudinal carrier 7 and an engine carrier 8 which is arranged above it. The respective wheel 23 is spaced apart laterally in the vehicle transverse direction y from the respective longitudinal carrier 7 and the respective engine carrier 8 which is arranged above it.

Furthermore, the front wall 5 of the vehicle sill 4, a lower region of a front vehicle body pillar or of an A-pillar 50 can be seen from FIG. 3. The A-pillar 50 is adjoined by the sill 16.

In FIG. 3, a front region of the outer longitudinal side wall 42a of the outwardly pointing longitudinal profile 42 of the sill 16 and that longitudinal side wall 46b of the reinforcement profile 36 which lies in the perpendicular plane have been omitted, with the result that the dimensions, the shape and the arrangement of the additional reinforcement profile 47 are visible.

FIG. 4 shows a first embodiment with a reinforcement profile 47, whereas FIG. 5 shows a second embodiment with two reinforcement profiles 47 and 51.

The cross sections of the sill 16 which are shown in FIGS. 4 and 5 run along the line IV-IV in FIG. 3 in the direction of the wheel 23. As is apparent from FIGS. 4 and 5, the reinforcement profile 36 covers a cross-sectional width $y_{25,26}$ of the wheel disk 26 of the spoke wheel 25 with the lower longitudinal side wall 46a and the upper longitudinal side wall 46c.

In the embodiments which are shown, a perpendicularly running side wall 48a of the reinforcement profile 47 is at approximately the same height with its outer face 52 which faces the wheel disk 26 as an outer face 53 of the wheel disk 26, which outer face 53 faces toward the vehicle body 2 of the motor vehicle 1.

The side walls 48b and 48c of the reinforcement profile 47 which adjoin the perpendicularly running front wall 48a of the reinforcement profile 47 and run approximately horizontally are connected to in each case one inner face 54a, 54c of the side walls 46a and 46c of the reinforcement profile 36 via a suitable connecting technique, such as welding, adhesive bonding and/or in a positively locking manner via screws and/or rivets.

A respective width $y_{47,48b}$ and $y_{47,48c}$ of the side walls 48b and 48c of the reinforcement profile 47 is dimensioned in such a way that a dimensionally stable, closed profile 55 is produced via the selected connecting technique or connecting techniques. The closed profile 55 has the side walls 46a, 46b and 46c of the reinforcement profile 36 and the side wall 48a of the reinforcement profile 47.

A second closed profile 65 has the side walls 48a, 48b and 48c of the reinforcement profile 47 and the side wall 38a of the longitudinal profile 41 of the sill 16. A third closed profile 59 is formed by the longitudinal profiles 41 and 42 of the sill 16. The closed profile 59 encloses the closed profiles 55 and 65. The closed profile 55 encloses the closed profile 65 at least on the three sides of the side walls 48a, 48b and 48c of the reinforcement profile 47.

A closed multiple-chamber profile 58 with three closed chambers or three closed profiles 59, 55, 65 therefore results in the embodiment which is shown in FIG. 4.

That front face 56 of the reinforcement profile 36 which is configured at the front end 49 of the closed profile 55 and that front face 57 of the reinforcement profile 47 which is configured at the front end 70 of the closed profile 65 point toward the spoke wheel 25 of the wheel 23.

The front face 56 of the reinforcement profile 36 and the front face 57 of the reinforcement profile 47 lie in a region between a wheel center or axis of symmetry 66 of the wheel hub 28 and an upper half of the wheel 23 in the embodiment which is shown. That front face 56a of the reinforcement profile 36 which is configured on the side wall 46a and that front face 57b of the reinforcement profile 47 which is configured on the side wall 48b lie at the level of the axis of symmetry 66 of the wheel hub 28.

The closed profile 55 has a predefined rigidity depending on the selected material, the selected shape of the reinforcement profiles 36 and 47, and the configuration of additional reinforcements, such as longitudinal ribs and/or transverse ribs, additional bulkheads, etc.

The predefined rigidity of the closed profile 55 is designed in such a way that the destruction of the spoke wheel 25 and its constituent parts, such as the wheel disk 26 and the rim 29, etc., takes place by way of that front face 56 of the reinforcement profile 36 which is configured at the front end 49(36), 70(47) of the closed profile 55 and by way of that front face 57 of the reinforcement profile 47 which is configured at the front end 49, 70 of the closed profile 55.

In the case of the impact of the wheel 23 or the spoke wheel 25 on the front end 17 of the sill 16, the front face 56 of the reinforcement profile 36 and the front face 57 of the reinforcement profile act in a similar manner to the sharp edge of a chisel.

The second embodiment which is shown in FIG. 5 corresponds to the first embodiment which is shown in FIG. 4, apart from the additional L-shaped reinforcement profile 51 which is arranged on the reinforcement profile 36 and the longitudinal profile 41 of the sill 16. For reasons of clarity, a multiplicity of the designations of FIG. 4 have been omitted in FIG. 5.

The L-shaped reinforcement profile 51 is fastened with its upper end 60 to the longitudinal side wall 46b of the reinforcement profile 36. The lower, angled-away end 61 of the reinforcement profile 51 is fastened to an inner face 62 of the longitudinal side wall 45 of the longitudinal profile 41 of the sill 16.

The additional reinforcement profile 51 extends from a front end 17 of the sill 16 over a predefined length $x_{51}$ which corresponds to the length $x_{47}$ of the reinforcement profile 47 in one embodiment, that is to say $x_{47}=x_{51}$. The reinforcement profile 47 and the reinforcement profile 51 have a length $x_{47}$ and a length $x_{51}$, respectively, which corresponds approximately to the mean width $x_{50}$ of the A-pillar 50 which is configured above it, that is to say $x_{47}=x_{51}=x_{50}$.

A closed multiple-chamber profile 63 with four closed chambers 59a, 59b, 55, 65 results in the embodiment which is shown in FIG. 5.

In contrast to the embodiment which is shown in FIG. 4, the multiple-chamber profile 63 of FIG. 5 has an additional front face 67 at the front end 68 of the reinforcement profile 51.

In addition to the front faces 56, 57 of the reinforcement profiles 36, 47, the front face 67 of the reinforcement profile 51 acts in a similar manner to the sharp edge of a chisel in the case of an impact of the wheel 23 or the spoke wheel 25 on the front end 17 of the sill 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle body that forms a passenger cell, the motor vehicle comprising:
   a front section configured in front of the passenger cell and on which two wheel arches are configured, a respective front wheel being arranged in each of the two wheel arches;
   a front wall delimits the passenger cell to the front toward the front section, the front wall being delimited laterally by a respective front vehicle body pillar, wherein a respective front end of a respective sill is configured at one lower end of the respective front vehicle body pillar, each respective sill running toward the rear in a longitudinal direction of the motor vehicle, wherein each respective sill forms a respective hollow profile, the respective front ends of the respective sills being substantially coplanar with the front wall, and
   a respective reinforcement profile being arranged in a respective cavity of the respective hollow profile, wherein the respective reinforcement profile which is arranged in the respective cavity of the respective sill has at least one respective additional reinforcement profile,
   wherein the respective front wheel is configured to move in a direction of the passenger cell as a result of a partially overlapping frontal collision, and
   wherein at least one of an arrangement, shape, length, material and connection of the respective reinforcement profile and the at least one respective additional reinforcement profile is configured such that front faces of said reinforcement profiles destroy the respective front wheel and associated components as a result of high impact energy on the respective front end of the respective sill when the respective front wheel moves in the direction of the passenger cell as a result of the partially overlapping frontal collision.

2. The motor vehicle as claimed in claim 1, wherein the at least one respective additional reinforcement profile extend from the respective front end of the respective sill over a predefined length in the longitudinal direction of the respective sill, such that the respective reinforcement profile and the at least one respective additional reinforcement profile are connected to one another, wherein each respective reinforcement profile has at least one front face at its respective front end at a level of the respective front end of the respective sill.

3. The motor vehicle as claimed in claim 1, wherein each respective reinforcement profile arranged in the respective cavity of the respective sill has a hat-shaped cross section.

4. The motor vehicle as claimed in claim 2, wherein each respective reinforcement profile arranged in the respective cavity of the respective sill has a hat-shaped cross section.

5. The motor vehicle as claimed 1, wherein each of the at least one respective additional reinforcement profile has a U-shaped cross section.

6. The motor vehicle as claimed 2, wherein each of the at least one respective additional reinforcement profile has a U-shaped cross section.

7. The motor vehicle as claimed 3, wherein each of the at least one respective additional reinforcement profile has a U-shaped cross section.

8. The motor vehicle as claimed 1, wherein the at least one respective additional reinforcement profile forms a closed profile with the respective reinforcement profile.

9. The motor vehicle as claimed 2, wherein the at least one respective additional reinforcement profile forms a closed profile with the respective reinforcement profile.

10. The motor vehicle as claimed 3, wherein the at least one respective additional reinforcement profile forms a closed profile with the respective reinforcement profile.

11. The motor vehicle as claimed 5, wherein the at least one respective additional reinforcement profile forms a closed profile with the respective reinforcement profile.

12. The motor vehicle as claimed in claim 1, wherein the at least one respective additional reinforcement profile is connected via side wall sections at approximately horizontally lying longitudinal side walls of the respective reinforcement profile which extend in the vehicle transverse direction.

13. The motor vehicle as claimed in 1, wherein a closed multiple-chamber profile with three closed chambers or profiles results in each respective cavity of each respective sill as a result of an arrangement of the respective reinforcement profile with the at least one respective additional reinforcement profile.

14. The motor vehicle as claimed in claim 1, wherein, at least one further reinforcement profile forms an extension in a downward or upward direction of a longitudinal side wall of the respective reinforcement profile, which longitudinal side wall lies in a perpendicular plane such that at least one multiple-chamber profile with at least four closed chambers is formed.

15. The motor vehicle as claimed in claim 1, wherein each of the respective sills, reinforcement profiles and additional reinforcement profiles is comprised of a metal or a non-metallic material such as a fiber-reinforced plastic.

16. The motor vehicle as claimed in claim 1, wherein each of the at least one respective additional reinforcement profiles has a length which corresponds approximately to the mean width of the A-pillar that is configured above such at least one respective additional reinforcement profiles.

* * * * *